April 5, 1955
E. V. FASCE ET AL
2,705,729
CARBONYLATION OF OLEFINS
Filed April 26, 1951
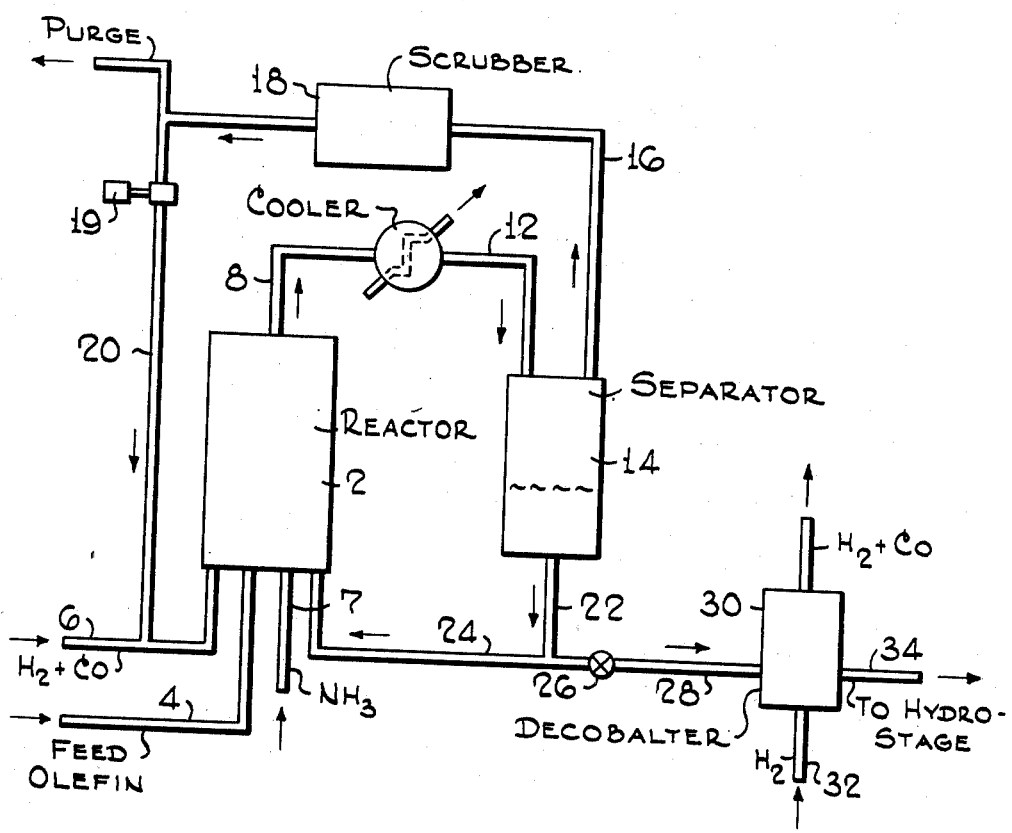
Egi V. Fasce
Joseph K. Mertzweiller Inventors
By J. Cushman Attorney

United States Patent Office 2,705,729
Patented Apr. 5, 1955

2,705,729

CARBONYLATION OF OLEFINS

Egi V. Fasce and Joseph K. Mertzweiller, Baton Rouge, La., assignors to Esso Research and Engineering Company, a corporation of Delaware Application April 26, 1951, Serial No. 223,095

8 Claims. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to a method for increasing the rate of reaction between the catalyst and the reagents and decreasing the time necessary for the initiation of the reaction.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalysts in the first stage of the prior art processes are usually added in the form of salts of the catalytically active metal with higher molecular fatty acids, such as stearic, oleic, palmitic, naphthenic, etc., acids. Thus, suitable catalysts are, for example, cobalt oleate or naphthenate or iron linoleate. These salts are soluble in the liquid olefin feed and may be supplied to the first stage as hydrocarbon solution or dissolved in the olefin feed. It has also been suggested to use slurries of oil-insoluble catalyst compounds, and the catalyst metal itself.

The synthesis gas mixture fed to the first stage may consist of any ratio of $H_2$ to CO, but preferably these gases are present in about equal volumes. The conditions of reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15,000 cubic feet of $H_2+CO$ per barrel of olefin feed are employed.

It will be understood that the "synthesis gas," previously referred to, i. e., a gaseous mixture containing primarily $H_2$ and CO may be made by a plurality of conventional methods. For instance, it may be made by the "water gas" reaction, in other words by reacting say coke with steam. Or, it may be made by "reforming" methane or natural gas with steam, or a mixture of steam and carbon dioxide.

At the end of the first stage, when the desired conversion of olefins to oxygenated compounds has been effected, the product and the unreacted material are generally withdrawn to a catalyst removal zone, where dissolved catalyst is removed from the mixture.

From the catalyst removal zone the reaction products, comprising essentially aldehydes, may be transferred to a hydrogenation zone, and the products reduced to the corresponding alcohols in a manner known per se.

As useful a tool as this aldehyde synthesis process is for organic synthesis, it has nonetheless been found hitherto that not all olefinic substances are equally susceptible to the carbonylation, or "oxo" reaction. Thus, some highly branch chained olefins react with difficulty, and others have hitherto been found not to react at all. This has been attributed to steric factors. It has also been found that most olefinic feed stocks show a very definite induction period, that is, a period of time which may last as little as a few minutes to many hours, during which time the olefins, CO, $H_2$ and the catalyst are present and in intimate contact under reaction conditions without any substantial aldehyde synthesis reaction taking place; at the end of the induction period there follows a sudden pressure drop indicative of gas absorption, and the reaction proceeds rapidly or moderately, depending upon conditions and the nature of the olefin. Such induction periods have been found particularly in olefinic feed stocks resulting from cracking processes, particularly steam cracking operations. Olefinic products derived from wax cracking and petrolatum cracking have also shown erratic behavior and lengthy induction periods when subjected to the aldehyde synthesis reaction. Most of these feed stocks had essentially straight chains and, in the case of the products resulting from petrolatum cracking, terminal olefin linkages; these conditions are generally considered to be most suitable for rapid carbonylation. Lengthy induction periods are most undesirable in commercial operations, for throughput rates and process efficiencies are materially affected thereby.

It is, therefore, the principal purpose of the present invention to increase the efficiency of the aldehyde synthesis reaction by decreasing the induction period required for the olefins to undergo catalytic reaction with CO and $H_2$.

It is also a purpose of the present invention to increase the efficiency of the aldehyde synthesis reaction by increasing the rate of the catalytic reaction of the olefins with CO and $H_2$.

Other and further objects and advantages of the present invention will become apparent from the more detailed description hereinafter.

It has now been found that the induction period exhibited by many olefinic hydrocarbons when subjected to the aldehyde synthesis reaction may be materially shortened by the addition of ammonia to the aldehyde synthesis reaction zone, in concentrations of from about 0.05 to about 0.15% by weight. This is a surprising result, for not only has it been taught by the prior art that ammonia is a poison to the aldehyde synthesis, or oxo, reaction, but also it might be expected that the reagent would form stable cobalt ammonia complexes with the cobalt catalyst; as the active catalyst is considered to be cobalt hydrocarbonyl, there would be expected to take place a competition for cobalt atoms by CO and $NH_3$, resulting in a net decrease of the carbonyl. Surprisingly, however, the reaction between olefin and synthesis gases is accelerated rather than decreased.

It has also been found that the inhibiting effect resulting in extended induction periods may be attributable to several causes. It has now been found that di-olefinic constituents, when present in small critical amounts, exert a marked inhibiting effect on the reaction. In large concentrations, however, di-olefins react extremely rapidly in the synthesis, sometimes polymerizing and at others, forming monomeric saturated aldehydes. It is probably due to the presence of small amounts of di-olefins, that steam cracking and petrolatum cracking products show induction periods. Other materials which have now been shown to have aldehyde synthesis inhibition characteristics are oleic acid and paraffinic acids generally. As these acids are generally present because of their addition in the form of catalyst salts, the use of ammonia as part of the aldehyde synthesis process aids considerably the efficiency of this reaction.

The present invention and its application will best be understood from the more detailed description hereinafter, wherein reference will be made to the accompanying drawing, which is a schematic representation of a system suitable for carrying out a preferred embodiment of the invention. Referring now to the diagram, an olefinic hydrocarbon having one carbon atom less than the number of carbon atoms in the desired resulting oxygenated compound, and preferably alkali washed prior to reaction, is fed through feed line 4 to the bottom portion of primary reactor 2. The latter comprises a reaction vessel which may, if desired, be packed with non-catalytic material, such as Raschig rings, porcelain chips, pumice, and the like. Reactor 2 may be divided into discrete packed zones, or it may comprise but a single packed zone, or even, if desired, may contain no packing.

The olefinic feed preferably contains dissolved therein ⅓% by weight of cobalt oleate based on the olefin. Other compounds of cobalt or iron, or their mixtures, may also be used. Simultaneously a gas mixture comprising $H_2$ and CO in the approximate ratio of 0.5 to 2 volumes of $H_2$ per volume of CO is supplied through line 6 to primary reactor 2 and flows concurrently through reactor 2 with said olefin feed. Reactor 2 is preferably operated at a pressure of about 2500–3500 p. s. i. g. and at a temperature of about 250°–450° F., depending upon the olefin feed and other reaction conditions.

In accordance with the present invention, ammonia is continuously or intermittently injected into reactor 2 through line 7. Though an aqueous solution may be used, it is preferable to employ a feed of substantially anhydrous ammonia. The rate is adjusted to the rate and the nature of the olefin feed; where the latter has a low induction period, less is required than when a high induction period olefin is employed. In general, an amount of ammonia equivalent to a concentration of 0.05 to 0.15% by weight of olefin is employed.

Because of the increase in reaction rate and decrease in induction period, the olefin residence time is much shorter than formerly necessary for the specific feeds.

Liquid oxygenated reaction products containing catalyst in solution, and unreacted synthesis gases are withdrawn overhead from an upper portion of high pressure reactor 2 and are transferred through line 8 to cooler 10 in which any conventional means of cooling are employed, and from thence via line 12 to high pressure separator 14 where unreacted gases including ammonia, are withdrawn overhead through line 16, scrubbed in scrubber 18 of entrained liquid and cobalt carbonyl and used in any way desired. They may be recycled to synthesis gas feed line 6 via line 20 and booster compressor 19, or purged.

A stream of primary reaction product containing dissolved therein relatively high concentration of cobalt carbonyl is withdrawn from separator 14 through line 22. A portion of said withdrawn stream may be recycled, if desired, to reactor 2 via line 24 to aid in the cooling and maintenance of temperature control of the primary carbonylation stage. The balance of the primary reaction product may be withdrawn through pressure release valve 26 and through line 28. The withdrawn liquid may comprise any unreacted olefin as well as aldehydes, secondary reaction products, and dissolved catalyst compounds. This liquid may be passed to catalyst decomposition zone 30, where dissolved catalyst is decomposed to the metal or other insoluble form by suitable heat treatment with an inert gas or vapor, such as steam, as a result of which the metal carbonyl is decomposed to metal or other form of cobalt, and carbon monoxide is evolved. The gas or vapor is admitted through line 32. The catalyst-free metal, after filtering, may be passed through line 34 to a hydrogenation zone, wherein it is converted into the corresponding alcohols, all in a manner known per se.

The process of the invention admits of numerous modifications apparent to those skilled in the art.

The process of the invention, and the beneficial effects obtained in operating in accordance therewith, may be illustrated by the following specific examples, wherein olefinic cuts were subjected under various conditions to the aldehyde synthesis reaction with and without the addition of ammonia. For comparison there were taken a $C_7$ and a $C_{12}$ olefin cut prepared by polymerizing a mixture of propylene and butylenes present in refinery streams over a $P_2O_5$-kieselguhr catalyst. The catalyst in the runs was at all times cobalt oleate and the runs were carried out in autoclaves. The technique employed was as follows.

Reactions were carried out with 3.5 mols of the respective polypropylene fraction, and the mixture placed in a 3 liter shaker autoclave, pressure tested cold with 1/1 $H_2$/CO gas, depressurized to about 200 pounds, and the system heated to about 300°–375° F. as shown. Pressure was then increased to about 2700–2900 p. s. i. and the system blocked from the pressure source. Reaction was allowed to proceed and the pressure drop recorded as a function of time, the induction period being noted.

| Run | Autoclave | Olefin Feed | Percent Cobalt | Percent NH₃, Wt. | Temp., °F. Start | Temp., °F. Max. | Induction Period, Min. |
|---|---|---|---|---|---|---|---|
| A | Glass Lined | C₇ | 0.3 | | 315 | 465 | 6 |
| B | ----do---- | C₇ | 0.3 | 0.106 | 315 | 465 | 7 |
| C | ----do---- | C₁₂ | 0.2 | | 340 | 370 | 35 |
| D | ----do---- | C₁₂ | 0.2 | 0.14 | 340 | 400 | <2 |
| E | Stainless Steel | C₁₂ | 0.21 | | 300 | 306 | 76 |
| F | ----do---- | C₁₂ | 0.21 | | 330 | 338 | 20 |
| G | ----do---- | C₁₂ | 0.21 | 0.053 | 300 | 320 | 7 |
| H | ----do---- | C₁₂ | 0.21 | 0.053 | 330 | 345 | 4 |
| I | ----do---- | C₇+4.2% Isoprene | 0.28 | | 350 | 425 | 130 |
| J | ----do---- | ----do---- | 0.28 | | 375 | 430 | 50 |
| K | ----do---- | ----do---- | 0.27 | 0.11 | 350 | 390 | 50 |
| L | ----do---- | ----do---- | 0.27 | 0.11 | 375 | 420 | 33 |
| M | ----do---- | ----do---- | 0.15 | ¹0.11 | 350 | 385 | 53 |
| N | ----do---- | ----do---- | 0.15 | ¹0.11 | 375 | 410 | 31 |

¹ Feed and catalyst saturated with ammonia.

These results clearly demonstrate that, at a given temperature level or catalyst concentration level, the induction period, or the time necessary for the reaction to start, is considerably decreased in the presence of the small amount of ammonia. It is further observed that the increase in induction period that obtains when a diolefin such as isoprene is present, is counteracted by the ammonia addition.

While the foregoing description and exemplary operations have served to illustrate specific applications and results, the invention is not limited thereto. Other modifications may appear to those skilled in the art.

What is claimed is:

1. An improved process for oxonating contaminated olefinic hydrocarbon compounds and for decreasing the induction period of said compounds which comprises passing said contaminated olefinic material to an oxonation zone, adding to said zone carbon monoxide, hydrogen, a cobalt-comprising oxonation catalyst and about 0.05 to about 0.15% by weight of ammonia based on said olefin, said ammonia being present in less than stoichiometric amounts and maintaining in said zone elevated temperatures and pressures conducive to the formation of an aldehyde product having at least one more carbon atom than said olefinic compound.

2. The process of claim 1 wherein said ammonia is added in anhydrous form.

3. The process of claim 1 wherein said catalyst is the cobalt salt of an acid which inhibits the oxonation reaction.

4. The process of claim 3 wherein said catalyst is cobalt oleate.

5. An improved process for preparing oxygenated organic compounds from mono-olefinic hydrocarbons contaminated with minor amounts of diolefinic impurities which comprises passing said contaminated olefinic material to a carbonylation reaction zone, adding to said zone carbon monoxide, hydrogen, a cobalt-comprising carbonylation catalyst and about 0.05 to about 0.15% by weight of olefin of ammonia and maintaining in said zone elevated temperatures and pressures conducive to the formation of an aldehyde product having at least one more carbon atom than said mono-olefinic compound.

6. The process of claim 5 wherein said contaminated olefinic product is obtained from the cracking of waxes and petrolatum.

7. The process of claim 5 wherein said carbonylation conditions comprise temperatures of about 250° to 450° F. and pressures of about 1500 to 4500 p. s. i. g.

8. The process of claim 5 wherein ammonia is added to said synthesis gas prior to passage of said gas to said oxonation zone.

References Cited in the file of this patent

UNITED STATES PATENTS 2,542,747    Barrick _____ Feb. 20, 1951

OTHER REFERENCES

I. G. Farbenindustrie patent appl. I. 71 700 IV d/120, 2 pgs. (O. Z. 13,284) T. O. M. Reel 36, Item 21 and Part of Item 36 (Deposited in Library of Congress) April 18, 1946. Also available in the Meyer Translation, Chapter 12.

Fiat Final Report No. 1000, PB–81383, Sec. 26, 1947, page 2.

Bull. Soc. Chim. de France 5th Ser. vol. 14 March–April 1947, pages 152–157. Only page 157 used. Article by Willemart.

Report of Investigations Bureau of Mines, R. I. 4270, June 1948. Report by Wender et al., page 11.